United States Patent
Sucke et al.

(10) Patent No.: US 6,928,910 B2
(45) Date of Patent: Aug. 16, 2005

(54) METHOD FOR SEPARATING A FLAT PIPE SECTION OF ALUMINUM OR ALUMINUM ALLOY FROM A SOLDER-COATED THIN-WALLED FLAT PIPE SECTION MEMBER

(75) Inventors: Norbert William Sucke, Duisburg (DE); Ismail Boyraz, Bochum (DE)

(73) Assignee: Erbslöh Aluminium GmbH, Velbert (DE)

( * ) Notice: Subject to any disclaimer, the term of this patent is extended or adjusted under 35 U.S.C. 154(b) by 0 days.

(21) Appl. No.: 10/376,511

(22) Filed: Feb. 28, 2003

(65) Prior Publication Data

US 2003/0177882 A1 Sep. 25, 2003

(30) Foreign Application Priority Data

Mar. 20, 2002 (DE) ......................................... 102 12 309

(51) Int. Cl.$^7$ ............................................... B23D 21/00
(52) U.S. Cl. ................... 83/39; 83/54; 83/862
(58) Field of Search .................. 83/14, 39, 54, 83/861–865; 225/2, 100, 101; 29/412–414

(56) References Cited

U.S. PATENT DOCUMENTS

| 3,679,109 | A | | 7/1972 | King, Jr. |
| 5,133,492 | A | | 7/1992 | Wohrstein et al. |
| 5,249,345 | A | * | 10/1993 | Virsik et al. ................... 225/2 |
| 5,388,745 | A | * | 2/1995 | Stroup, Sr. ..................... 225/2 |
| 5,653,022 | A | * | 8/1997 | Logic .......................... 225/100 |
| 6,061,905 | A | * | 5/2000 | Logic .......................... 225/100 |
| 6,357,327 | B1 | * | 3/2002 | Usui et al. ..................... 83/862 |

FOREIGN PATENT DOCUMENTS

| DE | 4303180 | 1/1994 |
| DE | 100 24 083 C1 | 12/2001 |
| EP | 693 28 446 T2 | 12/2000 |

* cited by examiner

*Primary Examiner*—Stephen Choi
(74) *Attorney, Agent, or Firm*—Friedrich Kueffner

(57) ABSTRACT

In a method for separating a flat pipe section of aluminum or an aluminum alloy from a solder-coated, thin-walled flat pipe section member for producing a clean, bur-free separating cut, the solder coating is first mechanically removed from the flat pipe section member at a predetermined separating location and, subsequently, the flat pipe section member is cut with at least one sharp cutting blade at the predetermined separating location.

12 Claims, No Drawings

METHOD FOR SEPARATING A FLAT PIPE SECTION OF ALUMINUM OR ALUMINUM ALLOY FROM A SOLDER-COATED THIN-WALLED FLAT PIPE SECTION MEMBER

BACKGROUND OF THE INVENTION

1. Field of the Invention

The invention relates to a method for separating or cutting a flat pipe section of aluminum or an aluminum alloy from a solder-coated, thin-walled flat pipe section member, for example, an extruded flat pipe section member, in particular, a solder-coated thin-walled multi-chamber flat pipe section member, wherein by means of at least one sharp cutting blade a clean, bur-free separating cut is produced at a predetermined separating location. Such pipe sections are used in connection with heat exchangers. For producing different types of heat exchangers, the solder-coated flat pipe sections are connected by brazing to additional components.

2. Description of the Related Art

European patent 0 714 342 B1 discloses a method for separating an elongate thin-walled pipe into pipe sections. In this method, a notch is produced in the pipe material by means of a blade wherein the notch has a depth that is somewhat less than the thickness of the wall of the pipe. In a second step, the notch is widened and, subsequently, a tensile force is exerted causing the pipe section to become separated. In this way, a bur-free separation cut is obtained. However, this method has the disadvantage that, in the case of solder-coated section members to be separated into individual pipe sections, the cutting blades become worn very quickly. This is caused by the solder coating. Generally, aluminum silicon alloys having a high silicon contents or silicon alloys are used as a solder for the flat pipe sections of aluminum. The high contents of silicon makes this coating very hard and abrasive. The wear on the separating or cutting tools is significantly accelerated in comparison to pipes without coating. High tool expenditures are the result.

For an excellent separating cut, the precision cutting blade, also called cutter, must always be very sharp. A worn cutting edge results in jagged separating cuts, deformations, and bur formation; when jointing the sections in a subsequent brazing process, these flaws are detrimental and prevent, in the worst-case scenario, a tight or sealed solder connection. The worn separating tools must therefore be exchanged in a timely fashion for a new or re-sharpened tool. This exchange, including possibly an alignment, of the cutting tools in the separating device represents an expensive downtime. In order to prevent the fast wear of the cutting tools, it is possible to first separate the flat pipe section member, for example, the extruded section member, into flat pipe sections and to subsequently coat the individual sections with solder. However, handling of the individual sections is more complex and it is not possible to prevent that solder and flux agents reach the interior of the flat pipe sections during the solder coating process; this can lead to corrosion and solder erosion.

SUMMARY OF THE INVENTION

It is an object of the present invention to provide a method of the aforementioned kind with which the disadvantages of the aforementioned prior art can be prevented and which, without great modifications in the production cycle, leads to flat pipe sections with clean and bur-free separating cuts.

In accordance with the present invention, this is achieved in that, before carrying out the separating cut, the solder coating is mechanically removed from the flat pipe section member at the predetermined cutting location.

According to the present intention, the solder-coated, thin-walled flat pipe section member of aluminum or an aluminum alloy, for example, an extruded section member, is divided at uniform spacings at the predetermined cutting locations, i.e., flat pipe sections of the desired length are produced. At each predetermined cutting location, the solder coating is first removed mechanically and, subsequently, the separating cut is carried out. In this way, the cutting tool remains sharp for the separating cut and provides in any situation an excellent, clean, bur-free separating cut. This is enabled in that the surface of the flat pipe section member no longer has hard particles, causing wear quickly, at the predetermined cutting surface. These hard solder particles are thus mechanically removed by a kind of broaching process. For this purpose, very different tools can be used, for example, slitting tools, milling tools, or cutting tools.

DESCRIPTION OF THE PREFERRED EMBODIMENTS

Flat pipe sections of aluminum for heat exchangers have a wall thickness of 0.1 to 3 mm, preferably 0.4 mm. The cutting tool for removing the solder coating generates a notch having a depth corresponding to the thickness of the coating in the wall of such a flat pipe section member in order to remove the coating. The depth of the notch is approximately 0.3 mm, preferably 0.1 mm. Of course, the cutting tool used in the broaching step for removing the solder coating is affected during the broaching process. The wear on the cutting edge of this tool, however, does not play a role in regard to a clean, excellent cut because the separating cut is carried out by an additional sharp cutting blade. The cutting blade itself is subjected only to very minimal wear, i.e., a tool exchange must be carried out only after significantly extended periods of use of the separating tool. In this way, the method according to the invention reduces the amount of valuable production time that is lost otherwise.

Depending on the production method which has been carried out in the past and the corresponding already installed production facilities, different method variations are possible.

In general, a solder-coated, thin-walled flat pipe section member is separated at several predetermined transverse cutting locations in the longitudinal direction and a flat pipe section is separated from the section member with each cut. After each cutting step, the flat pipe section member is moved in the longitudinal direction by precisely the length matching the distance between two predetermined cutting locations. In this way, a predetermined cutting location on the flat pipe section member reaches precisely the position where the cutting blade engages. Different types of cutting devices (cutters) are employed. For example, the separating cut is carried out by means of two cutting blades wherein the cutting blades either penetrate sequentially the wall of the section or simultaneously from different sides of the wall. Moreover, individual cutting blades can be used. In this case, the cutting blade does not penetrate the entire thickness of the respective wall of the flat section member but only penetrates to a depth somewhat less than the thickness of the wall. The separation of the flat pipe section in this case is carried out by a tensile force acting in the longitudinal direction of the section member.

The step for removing the solder coating, with respect to a predetermined cutting location, must be carried out before the separating cut. In a repetitive production cycle, the process for removing the solder coating and the process of separating can be carried out temporally or spatially in sequence. For example, removal of the solder coating and the separating cut can be carried out simultaneously in that, for example, the tool for removing the solder coating is arranged in the direction of the section member upstream of the cutting tool. This tool generates, for example, a notch in the flat pipe section member and a flat pipe section is then cut off in the subsequent cycle, i.e., after the flat pipe section member has been moved in the longitudinal direction, by a separating cut from the flat pipe section member. Such a variant is preferred when, for example, the separating cut is carried out by means of several cutting blades and when the local conditions enable this.

In another variant, at the same location of the flat pipe section member, i.e., at the predetermined cutting location, the removal of the solder coating and the separating cut are carried out temporally in sequence. Preferably, both tools are fastened and aligned on one and the same device. This can be, for example, a carriage or slide when the feeding movement toward the flat pipe section member is linear. As soon as the flat pipe section member has been moved in the longitudinal direction and the predetermined cutting location has been positioned correctly in the area of the two tools, feeding or advancing of the tools is carried out: First, the tool for removing the solder coating reaches the pipe section member and removes the solder coating, for example, produces a notch in the wall of the flat pipe section member. Subsequently, the cutting tool moves into the generated notch and carries out the separating cut.

The new method according to the invention solves the aforementioned object by means of an additional but temporally neutral working step.

While specific embodiments of the invention have been shown and described in detail to illustrate the inventive principles, it will be understood that the invention may be embodied otherwise without departing from such principles.

What is claimed is:

1. A method for separating a flat pipe section of aluminum or an aluminum alloy from a solder-coated, thin-walled flat pipe section member for producing a clean, bur-free separating cut, the method comprising the steps of:
   a) mechanically removing a solder coating from a flat pipe section member at a predetermined cutting location with a first tool that penetrates into a wall of the flat pipe section member and generates a notch that corresponds to a thickness of the solder coating at the predetermined cutting location; and
   b) subsequently cutting the flat pipe section member at the predetermined cutting location with a second tool having at least one sharp cutting blade so as to obtain a clean, bur-free separating cut.

2. The method according to claim 1, wherein in the step b) two of the sharp cutting blades are used.

3. The method according to claim 2, wherein in the step b) the at least one sharp cutting blade does not cut a thickness of a wall of the flat pipe section member completely, the method further comprising the step of applying an axial tensile force in a longitudinal direction of the flat pipe section member subsequent to the step b) for completely separating a flat pipe section from the flat pipe section member.

4. The method according to claim 1, wherein in the step a) a milling tool, a scoring tool or a cutting tool is used.

5. The method according to claim 1, wherein the notch has a depth of up to 0.3 mm.

6. The method according to claim 5, wherein the notch as a depth of 0.1 mm.

7. The method according to claim 1, wherein at different predetermined cutting locations of the flat pipe section member in a single separating plane simultaneously the step a) and the step b) are carried.

8. The method according to claim 7, wherein simultaneously the step a) and the step b) are carried out on the flat pipe section member at two successively arranged predetermined cutting locations, the method further comprising the step of subsequently moving the flat pipe section member in a longitudinal direction of the flat pipe section member by a distance matching a spacing of the two predetermined cutting locations, so that the location where the step a) has been performed is moved to the location where the step b) has been performed.

9. The method according to claim 1, wherein the steps a) and b) are carried out sequentially at the predetermined cutting location, the method further comprising the step of subsequently moving the flat pipe section member in a longitudinal direction of the flat pipe section member by a distance matching a distance between two adjacent predetermined cutting locations.

10. The method according to claim 1, wherein a tool used in the step a) and the at least one cutting blade used in the step b) are fastened successively to a common device such that the device moves the tool used in the step a) and the at least one cutting blade used in the step b) simultaneously in a direction toward the flat pipe section member but employs the tool used in the step a) and the at least one cutting blade used in the step b) sequentially.

11. The method according to claim 1, wherein in the step a) and in the step b) a same type of cutting tool is used.

12. The method according to claim 1, wherein the flat pipe section member is a multi-chamber flat pipe section member.

* * * * *